Figure 4:
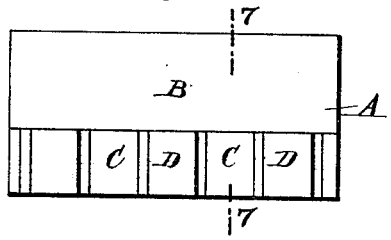
Figure 5:
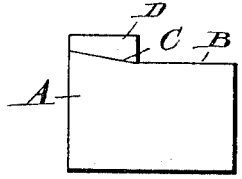
Figure 6:
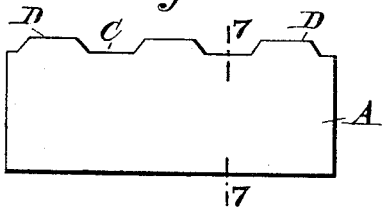
Figure 7:
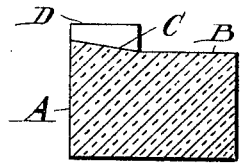
Figure 8:
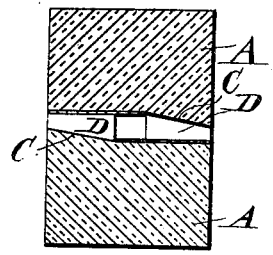
Figure 9:
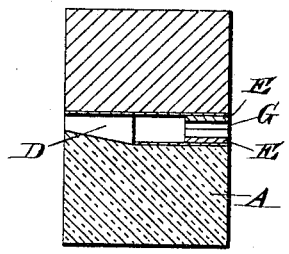
Figure 10:
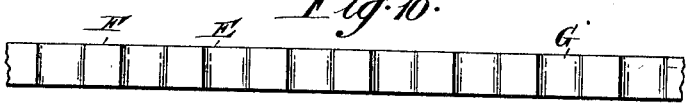
Figure 11:
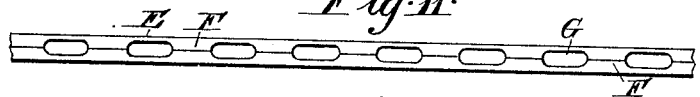

No. 697,815. Patented Apr. 15, 1902.
T. DARLINGTON.
MEANS FOR VENTILATING BUILDINGS.
(Application filed Oct. 21, 1901.)
(No Model.) 2 Sheets—Sheet 1.
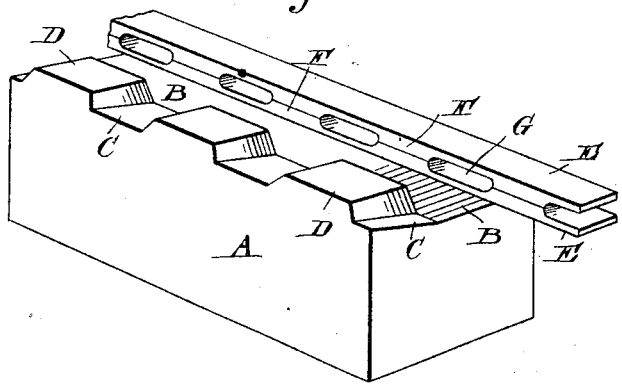
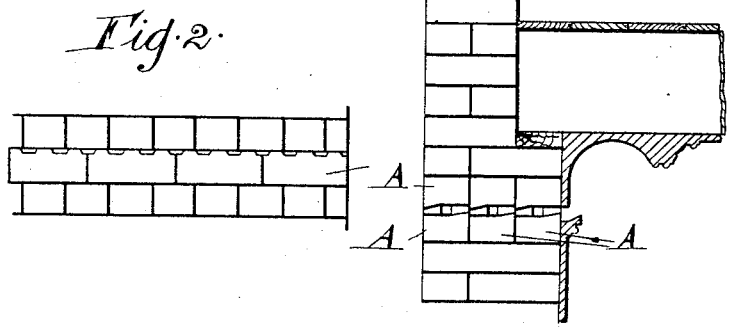
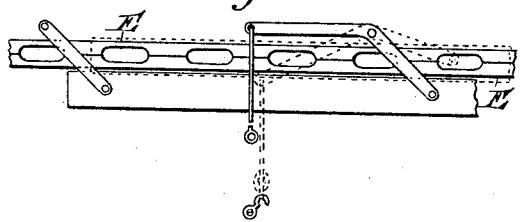
Witnesses
Percy J. Hedges
Walter C. Hart
Inventor
Thomas Darlington
by Edw Baker & Son
Attorneys No. 697,815. Patented Apr. 15, 1902.
T. DARLINGTON.
MEANS FOR VENTILATING BUILDINGS.
(Application filed Oct. 21, 1901.)
(No Model.) 2 Sheets—Sheet 2.

Witnesses
Percy J Hedges
Walter C. Hart

Inventor
Thomas Darlington
by Edw Walters + Son
Attorneys.

THE NORRIS PETERS CO., PHOTO-LITHO., WASHINGTON, D. C.

United States Patent Office.

THOMAS DARLINGTON, OF SOUTH MELBOURNE, VICTORIA, AUSTRALIA.

MEANS FOR VENTILATING BUILDINGS.

SPECIFICATION forming part of Letters Patent No. 697,815, dated April 15, 1902.

Application filed October 21, 1901. Serial No. 79,449. (No model.)

*To all whom it may concern:*

Be it known that I, THOMAS DARLINGTON, builder, a subject of the King of Great Britain, residing at and whose post-office address is 261 and 263 Moray street, South Melbourne, in the State of Victoria and Commonwealth of Australia, have invented Improved Means for Ventilating Buildings, of which the following is a specification.

Hitherto provision has been made for ventilating buildings by leaving gaps or openings in the brickwork at intervals and by building in a grating on either side, those intended for the interior of the room being usually of a more or less decorative character. Apart from the cost of this means of ventilation there are other drawbacks, among which may be mentioned the fact that the inrush or discharge of air is concentrated instead of being diffused evenly around the room or building. I have therefore devised the herein-described means for ventilating buildings, which while being free from some of the defects incidental to the means usually employed can be applied in a variety of ways, according to the nature or the particular part of the building to be ventilated.

In order that my invention may be readily understood, I will describe it by reference to the accompanying drawings, in which—

Figure 1 is a perspective view illustrating my improved means for ventilating buildings. Fig. 2 is an elevation of a course of brickwork, and Fig. 3 is a section of part of a building fitted with my said invention. Figs. 4 to 12 are various views illustrating the construction of the different parts of my improved means for ventilating buildings. Fig. 13 is a front elevation illustrating the application of a convenient shutter for closing the ventilating-openings, if desired.

The same letters of reference indicate the same parts in all the figures.

My invention comprises an oblong block A of brick or other suitable material which can be molded, cast, or otherwise manufactured cheaply and which will be suitable for being built into brick or stone work or secured within a wooden or other wall of a building. The upper surface of this block A is horizontal for the greater part of its width, as illustrated at B, while about one-third of its said upper surface is inclined, as illustrated at C. This inclined surface as constructed is provided at intervals with bosses or projections D, the upper surfaces of which are flat and comparatively broad. The spaces left between these projections are sufficiently wide to insure perfect ventilation without being high enough to allow mice and other small animals to pass through.

Resting upon the flat surface B of the block A are two bars E of iron or other suitable material, the adjacent surfaces of which are formed with alternate projections F and recessses G. The height of these two bars is practically equal to the height of the projections D on the block A, so that when placed in position upon said block they form with said projections D a level surface upon which the next course of brickwork can be laid, strips of composite sheeting (such as rubberoid) being laid above and below the bars to provide a tight joint.

For a cheaper class of work the blocks A can be used without the bars E, one block being reversed and placed upon the other so that its projections D bear upon the horizontal surface B of the other block, care being taken to set the inclined surface C on the inside of the wall in order to keep out the weather.

Figure 12:
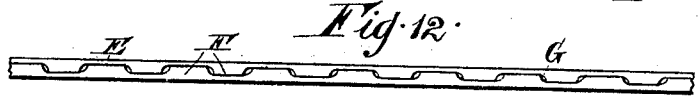

The bars E can be used in lieu of the hoop-iron ties usually employed in brickwork, or by placing two bars face to face, with their projections in engagement with each other, as illustrated in Fig. 12, they will serve as plates for various purposes. They can also be arranged at right angles to each other to serve as a corner or angle tie, or they can be cut off to suitable lengths and be fitted in position for the purpose of binding a hollow wall together.

The arrangement illustrated in Fig. 13 can be conveniently employed for closing the ventilating-openings inside a room, if desired. It consists of a plate of hoop-iron or similar material suspended by parallel links, to one of which is attached a projecting arm or lever operated by a cord which can be pulled down in order to raise said shutter, and thus close the ventilating-openings, or can be released to allow said shutter to fall, and thereby uncover said openings.

It will be evident to builders and others skilled in the art to which this invention relates that the improved means for ventilating buildings herein described can be set in the walls at any convenient positions. For instance, they might be arranged to discharge just above the lower molding of the cornice, as illustrated in Fig. 3, or they could be arranged to discharge just above any article of furniture in the room.

Having now particularly described and ascertained the nature of my said invention and in what manner the same is to be performed, I declare that what I claim is—

1. Improved means for ventilating buildings comprising blocks (such as A) of brick or other material having part of their upper surface inclined and fitted with projections (as D) at intervals in combination with rolled-iron or other bars (as E) having their adjacent surfaces formed with projections (as F) the whole being constructed and arranged substantially as and for the purposes specified and as illustrated in the accompanying drawings.

2. In means for ventilating buildings, oblong blocks of brick or other material having part of their upper surface inclined and formed with projections (as D) along one side, substantially as and for the purposes specified, and as illustrated in the accompanying drawings.

In testimony whereof I have hereunto set my hand in presence of two subscribing witnesses.

THOMAS DARLINGTON.

Witnesses:
EDWARD WATERS, Jr.,
WALTER SMYTHE BAYSTON.